US011887514B2

(12) United States Patent
Tao

(10) Patent No.: US 11,887,514 B2
(45) Date of Patent: Jan. 30, 2024

(54) DISPLAY DEVICE

(71) Applicant: WUHAN CHINA STAR OPTOELECTRONICS TECHNOLOGY CO., LTD., Wuhan (CN)

(72) Inventor: Jian Tao, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 519 days.

(21) Appl. No.: 17/052,026

(22) PCT Filed: Jul. 30, 2020

(86) PCT No.: PCT/CN2020/105813
§ 371 (c)(1),
(2) Date: Oct. 30, 2020

(87) PCT Pub. No.: WO2022/007061
PCT Pub. Date: Jan. 13, 2022

(65) Prior Publication Data
US 2023/0097811 A1 Mar. 30, 2023

(30) Foreign Application Priority Data
Jul. 8, 2020 (CN) ........................ 202010652474.X

(51) Int. Cl.
*G09G 3/00* (2006.01)

(52) U.S. Cl.
CPC ..... *G09G 3/006* (2013.01); *G09G 2310/0275* (2013.01); *G09G 2330/12* (2013.01)

(58) Field of Classification Search
CPC ........... G09G 2310/0275; G09G 3/006; G09G 2330/12
See application file for complete search history.

(56) References Cited

U.S. PATENT DOCUMENTS

2009/0243981 A1* 10/2009 Chen .................... G09G 3/3677 345/87
2015/0379952 A1* 12/2015 Lee .......................... G09G 3/20 345/92
(Continued)

FOREIGN PATENT DOCUMENTS

CN 101191910 A 6/2008
CN 101315508 A 12/2008
(Continued)

OTHER PUBLICATIONS

International Search Report and in International application No. PCT/CN2020/105813, dated Apr. 2, 2021.
(Continued)

*Primary Examiner* — Hang Lin
(74) *Attorney, Agent, or Firm* — PV IP PC; Wei Te Chung; Zhigang Ma

(57) ABSTRACT

A display device is provided. The display device includes a display panel and a plurality of driving chips. A detection circuit of each of the driving chips includes a plurality of sub-detection circuits. Each of the sub-detection circuits is correspondingly coupled to one data line through a control switch corresponding to each of the sub-detection circuits. The display panel further has a plurality of detection pads. A plurality of detection signals received by the detection pads are transmitted to the data lines through the sub-detection circuits. A portion of the data lines correspondingly coupled to each of the driving chips is grouped into a data line group. Resistance of the sub-detection circuits correspondingly coupled to the portion of the data lines in the data line group is caused to continuously gradually vary.

11 Claims, 2 Drawing Sheets

(56) References Cited

U.S. PATENT DOCUMENTS

| | | | |
|---|---|---|---|
| 2018/0307067 | A1 | 10/2018 | Hwang et al. |
| 2019/0180683 | A1 | 6/2019 | Lee et al. |

FOREIGN PATENT DOCUMENTS

| | | | |
|---|---|---|---|
| CN | 101950109 | A | 1/2011 |
| CN | 106057112 | A | 10/2016 |
| CN | 106782248 | A | 5/2017 |
| CN | 106782256 | A | 5/2017 |
| CN | 107393455 | A | 11/2017 |
| CN | 109192117 | A | 1/2019 |
| CN | 109345990 | A | 2/2019 |
| CN | 110910804 | A | 3/2020 |

OTHER PUBLICATIONS

Written Opinion of the International Search Authority in international application No. PCT/CN2020/105813, dated Apr. 2, 2021.

* cited by examiner

DISPLAY DEVICE

This application is a Notional Phase of PCT Patent Application No. PCT/CN2020/105813 having international filing date of Jul. 30, 2020, which claims priority to Chinese Patent Application with the application No. 202010652474.X filed on Jul. 8, 2020 with the National Intellectual Property Administration, the disclosure of which is incorporated by reference in the present application in its entirety.

FIELD OF INVENTION

The present disclosure relates to a technical field of displays, and more particularly to a display device.

BACKGROUND OF INVENTION

With a demand for full-screen mobile phones, narrowing of lower borders has become a stronger and stronger trend. This trend has also driven a narrow border trend of large-size products. Cell test (CT) detection circuits are of great significance to interception of large-size defective products. Thus, waste of material in subsequent stages is reduced. However, a situation in which CT detection circuits are placed in driving integrated circuit (IC) chips easily causes charging rate differences, resulting in a grayscale split-screen phenomenon. Thus, products may be falsely determined to be positive, affecting detection rates of production line operations.

In a traditional structure, there are some dummy pins in a middle of a driving IC chip, causing coupling a CT detection circuit on both sides of the dummy pins through a longer signal line to be needed. Because of a gap between the CT detection circuit on the both sides of the dummy pins that is caused by the dummy pins, resistance of the CT detection circuit on the both sides of the dummy pins has a larger difference. Thus, signals transmitted by the CT detection circuit on the both sides of the dummy pins to corresponding data lines are different. That is, charging rates of pixels are different, causing the split-screen phenomenon of a display panel.

Thus, it is urgently desired to solve deficiencies of the related art.

SUMMARY OF INVENTION

A technical problems is as follows. The present disclosure provides a display device that can solve a problem that a situation in which detection circuits are placed in driving integrated circuit (IC) chips easily causes pixel charging rate differences, resulting in a split-screen phenomenon of a display panel.

Technical solutions are as follows. In order to solve the aforementioned problem, the present disclosure provides the following technical solutions.

The present disclosure provides a display device including a display panel and at least two driving chips located in a bonding area of the display panel.

wherein each of the driving chips has a detection circuit disposed therein; wherein the detection circuit includes a plurality of sub-detection circuits; wherein each of the sub-detection circuits includes a control switch; and wherein each of the sub-detection circuits is correspondingly coupled to one data line in a display area of the display panel through the control switch corresponding to each of the sub-detection circuits;

wherein a plurality of detection pads are disposed in a non-display area on a side of the display panel corresponding to the driving chips; wherein the detection pads are electrically coupled to the detection circuits; and wherein a plurality of detection signals received by the detection pads are transmitted to the data lines through the sub-detection circuits;

wherein a portion of the data lines correspondingly coupled to each of the driving chips is grouped into a data line group; and wherein resistance of the sub-detection circuits correspondingly coupled to the portion of the data lines in the data line group gradually increases from two sides of the data line group to a middle of the data line group; or wherein resistance of the sub-detection circuits correspondingly coupled to the portion of the data lines in the data line group gradually increases from a middle of the data line group to two sides of the data line group.

In the display device of the present disclosure, the detection circuit includes a detection control line, at least two detection signal lines, and a plurality of control switch groups; and wherein a portion of the control switches in each of the control switch groups is in one-to-one correspondence with the detection signal lines;

wherein the control switch has an input terminal coupled to the detection signal line corresponding to the control switch, a control terminal coupled to the detection control line, and an output terminal coupled to the data line.

In the display device of the present disclosure, the detection control lines of the detection circuits of each adjacent two of the driving chips are electrically coupled to each other.

In the display device of the present disclosure, N of the driving chips are disposed in the bonding area, the detection pads include 2N detection pad groups, and N is a positive integer greater than or equal to one; wherein each of the detection pad groups includes at least two first detection pads that are in one-to-one correspondence with the detection signal lines and a second detection pad corresponding to the detection control line; wherein each of the driving chips is correspondingly coupled to two of the detection pad groups, and two of the first detection pads in the two of the detection pad groups send one of the detection signals to two ends of each of the detection signal lines.

In the display device of the present disclosure, the resistance of the sub-detection circuits correspondingly coupled to the portion of the data lines in the data line group consistently vary from the two sides of the data line group to the middle of the data line group.

In the display device of the present disclosure, N of the driving chips are disposed in the bonding area, the detection pads include N+1 detection pad groups, and N is a positive integer greater than or equal to one; wherein each of the detection pad groups includes at least two first detection pads that are in one-to-one correspondence with the detection signal lines and a second detection pad corresponding to the detection control line; wherein two of the first detection pads in two of the detection pad groups send one of the detection signals to a middle of each of the detection signal lines.

In the display device of the present disclosure, a number of sub-detection circuits of the sub-detection circuits is same for each of two sides of a node where the one of the detection signals is sent to.

In the display device of the present disclosure, each of a second detection pad group of the detection pad groups to an Nth detection pad group of the detection pad groups provide a portion of the detection signals simultaneously to adjacent two of the driving chips corresponding to each of the second detection pad group of the detection pad groups to the Nth detection pad group of the detection pad groups.

In the display device of the present disclosure, the resistance of the sub-detection circuits correspondingly coupled to the portion of the data lines in the data line group consistently vary from the middle of the data line group to the two sides of the data line group.

In the display device of the present disclosure, adjacent two of the data lines are correspondingly coupled to adjacent two of the portion of the control switches in each of the control switch groups.

In order to solve the aforementioned problem, the present disclosure also provides a display device, including a display panel and at least two driving chips located in a bonding area of the display panel; wherein a display area of the display panel includes a plurality of data lines; wherein equally divided portions of the data lines are respectively coupled to the driving chips;

wherein each of the driving chips has a detection circuit disposed therein; wherein the detection circuit includes a plurality of sub-detection circuits; wherein each of the sub-detection circuits includes a control switch; and wherein each of the sub-detection circuits is correspondingly coupled to one data line in a display area of the display panel through the control switch corresponding to each of the sub-detection circuits;

wherein a plurality of detection pads are disposed in a non-display area on a side of the display panel corresponding to the driving chips; wherein the detection pads are electrically coupled to the detection circuits; and wherein a plurality of detection signals received by the detection pads are transmitted to the data lines through the sub-detection circuits;

wherein a portion of the data lines correspondingly coupled to each of the driving chips is grouped into a data line group; and wherein resistance of the sub-detection circuits correspondingly coupled to the portion of the data lines in the data line group gradually increases from two sides of the data line group to a middle of the data line group; or wherein resistance of the sub-detection circuits correspondingly coupled to the portion of the data lines in the data line group gradually increases from a middle of the data line group to two sides of the data line group.

In the display device of the present disclosure, the detection circuit includes a detection control line, at least two detection signal lines, and a plurality of control switch groups; and wherein a portion of the control switches in each of the control switch groups is in one-to-one correspondence with the detection signal lines;

wherein the control switch has an input terminal coupled to the detection signal line corresponding to the control switch, a control terminal coupled to the detection control line, and an output terminal coupled to the data line.

In the display device of the present disclosure, the detection control lines of the detection circuits of each adjacent two of the driving chips are electrically coupled to each other.

In the display device of the present disclosure, N of the driving chips are disposed in the bonding area, the detection pads include 2N detection pad groups, and N is a positive integer greater than or equal to one; wherein each of the detection pad groups includes at least two first detection pads that are in one-to-one correspondence with the detection signal lines and a second detection pad corresponding to the detection control line; wherein each of the driving chips is correspondingly coupled to two of the detection pad groups, and two of the first detection pads in the two of the detection pad groups send one of the detection signals to two ends of each of the detection signal lines.

In the display device of the present disclosure, the resistance of the sub-detection circuits correspondingly coupled to the portion of the data lines in the data line group consistently vary from the two sides of the data line group to the middle of the data line group.

In the display device of the present disclosure, N of the driving chips are disposed in the bonding area, the detection pads include N+1 detection pad groups, and N is a positive integer greater than or equal to one; wherein each of the detection pad groups includes at least two first detection pads that are in one-to-one correspondence with the detection signal lines and a second detection pad corresponding to the detection control line; wherein two of the first detection pads in two of the detection pad groups send one of the detection signals to a middle of each of the detection signal lines.

In the display device of the present disclosure, a number of sub-detection circuits of the sub-detection circuits is same for each of two sides of a node where the one of the detection signals is sent to.

In the display device of the present disclosure, each of a second detection pad group of the detection pad groups to an Nth detection pad group of the detection pad groups provide a portion of the detection signals simultaneously to adjacent two of the driving chips corresponding to each of the second detection pad group of the detection pad groups to the Nth detection pad group of the detection pad groups.

In the display device of the present disclosure, the resistance of the sub-detection circuits correspondingly coupled to the portion of the data lines in the data line group consistently vary from the middle of the data line group to the two sides of the data line group.

In the display device of the present disclosure, adjacent two of the data lines are correspondingly coupled to adjacent two of the portion of the control switches in each of the control switch groups.

Advantageous effects are as follows. For the display device of the present disclosure, coupling lines between the detection circuits of each adjacent two of the driving chips are disconnected. The detection pad groups two of which send a portion of the detection signals to two sides of the detection circuit of each of the driving chips are independent; alternatively, a portion of the detection signal are sent to a middle of the detection circuit of each of the driving chips. The resistance of the sub-detection circuits correspondingly coupled to the portion of the data lines in each of the data line groups is caused to continuously gradually vary. Thus, the problem that the situation in which the detection circuits are placed in the driving IC chips easily causes the pixel charging rate differences, resulting in the split-screen phenomenon of the display panel, is solved.

DESCRIPTION OF DRAWINGS

Specific embodiments of the present disclosure are described in detail in conjunction with the drawings, making technical solutions and other advantageous effects of the present disclosure obvious.

DETAILED DESCRIPTION OF PREFERRED EMBODIMENTS

Technical solutions in the embodiments of the present disclosure are clearly and completely described below in conjunction with the drawings in the embodiments of the present disclosure. Obviously, the described embodiments are only a portion of the embodiments of the present disclosure, not all of the embodiments. Based on the embodiments of the present disclosure, other embodiments obtained under a premise that inventive efforts are not made by persons of ordinary skill in the art are within the protection scope of the present disclosure.

In the description of the present disclosure, it is to be appreciated that orientation or location relationships indicated by terms such as "longitudinal", "transverse", "length", "width", "upper", "lower", "front", "back", "left", "right", "vertical", "horizontal", etc. are based on orientation or location relationships illustrated in the accompanying drawings. The terms are only used to facilitate the description of the present disclosure and to simplify the description, not used to indicate or imply the relevant device or element must have a particular orientation or must be structured and operate under the particular orientation and thus cannot be considered as limitations to the present disclosure. In addition, the terms "first" and "second" are only used for description purpose, and cannot be considered as indicating or implying relative importance or implicitly pointing out the number of relevant technical features. Thus, features being respectively defined as "first" and "second" can each expressly or implicitly include at least one of the features. In the description of the present disclosure, the meaning of "a plurality of" is at least two, such as two and three, unless otherwise definitely and specifically defined.

Figure 1:
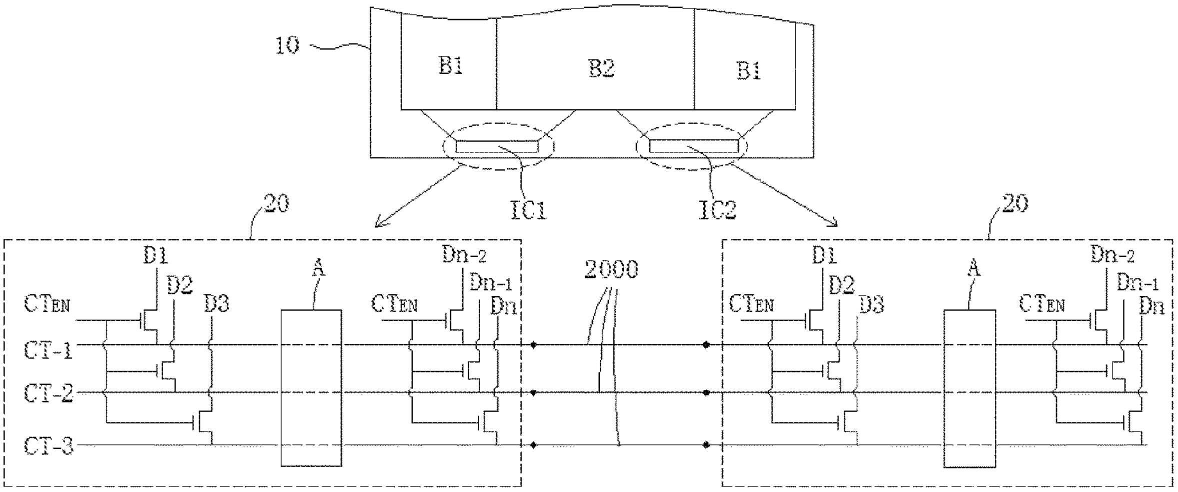
FIG. 1 is a schematic diagram of a structure of a traditional display device.

Referring to FIG. 1, a traditional display device is described by taking a display panel 10 with two driving chips bonded thereon as an example. For an existing cell test (CT) detection design, a plurality of detection circuits are respectively placed in a plurality of driving chips. Each of the detection circuits include a plurality of sub-detection circuits. Each of the sub-detection circuits is coupled to one data line. There are some dummy pins in a middle of each of the driving chips IC1 and IC2. Because the dummy pins occupy a certain space, a gap exists in the detection circuit in each of the driving chips IC1 and IC2. The detection circuits of each two of the driving chips are electrically coupled through a plurality of coupling lines 2000. In FIG. 1, an area A is a portion corresponding to the dummy pins. A detection circuit 20 on both sides of the area A needs to be coupled through a longer signal line. If a data line $D_3$ and a data line $D_{n-2}$ are two adjacent data lines, resistance of sub-detection circuits coupled to a data line $D_1$ to the data line $D_3$ has smaller differences. Resistance of sub-detection circuits coupled to the data line $D_3$ and the data line $D_{n-2}$ has a larger difference. Resistance of sub-detection circuits coupled to the data line $D_{n-2}$ to a data line $D_n$ has smaller differences. Thus, resistance of the sub-detection circuits coupled to the data lines $D_1$ to $D_n$ discontinuously vary, causing signals transmitted by the detection circuit to data lines to be different. Also, because a difference between entire resistance respectively of the sub-detection circuits on both sides of the area A is larger, pixel charging rates of an area B1 of a display area and pixel charging rates of an area B2 of the display area are different, resulting in a split-screen phenomenon of the display panel.

Figure 2:
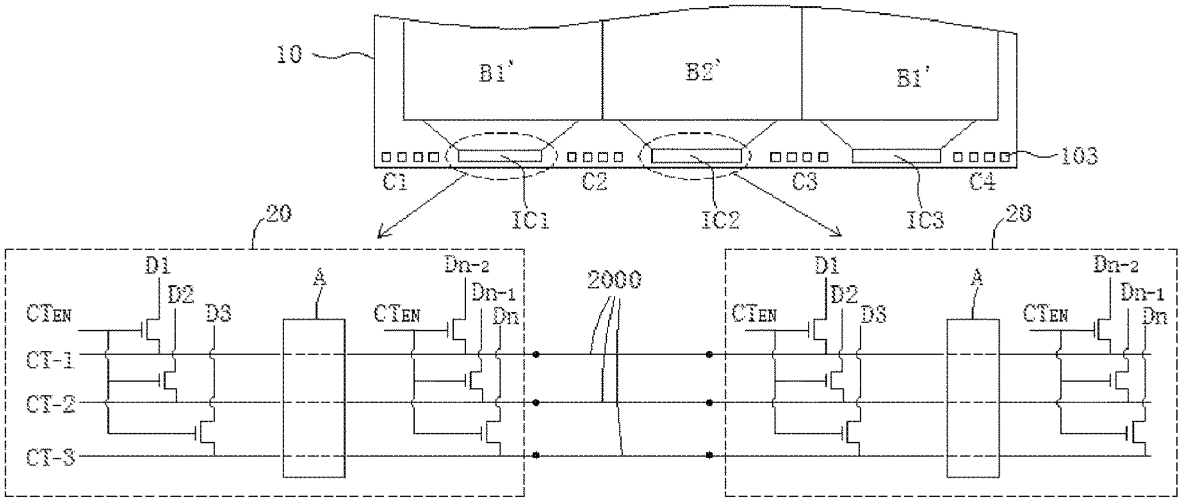
FIG. 2 is a schematic diagram of another structure of a traditional display device.

Referring to FIG. 2, another traditional display device is described by taking a display panel 10 with a plurality of driving chips thereon as an example. For the display device, a group of detection pads 103 is added between each adjacent two of the driving chips, as illustrated at a location C2 or a location C3 in FIG. 2. However, the group of detection pads 103 at each of the location C2 and the location C3 provides detection signals simultaneously to adjacent two of the driving chips, but a group of detection pads 103 at each of a location C1 and a location C4 provide detection signals only to one of the driving chips. Thus, compared with detection signal provision of the group of detection pads 103 at each of the location C1 and the location C4, detection signal provision of the group of detection pads 103 at each of the location C2 and the location C3 is different. As illustrated in FIG. 2, pixel charging rates of an area B1' of a display area and pixel charging rates of an area B2' of the display area are different, resulting in a phenomenon that a screen is split corresponding to a middle of each adjacent two of the driving chips. In addition, this design requires that the detection circuits 20 of the driving chips be coupled to each other through coupling lines 2000, so loads are larger, affecting pixel charging rates.

Thus, an object of the present disclosure is to provide a display device that solves the aforementioned problems.

Figure 3:
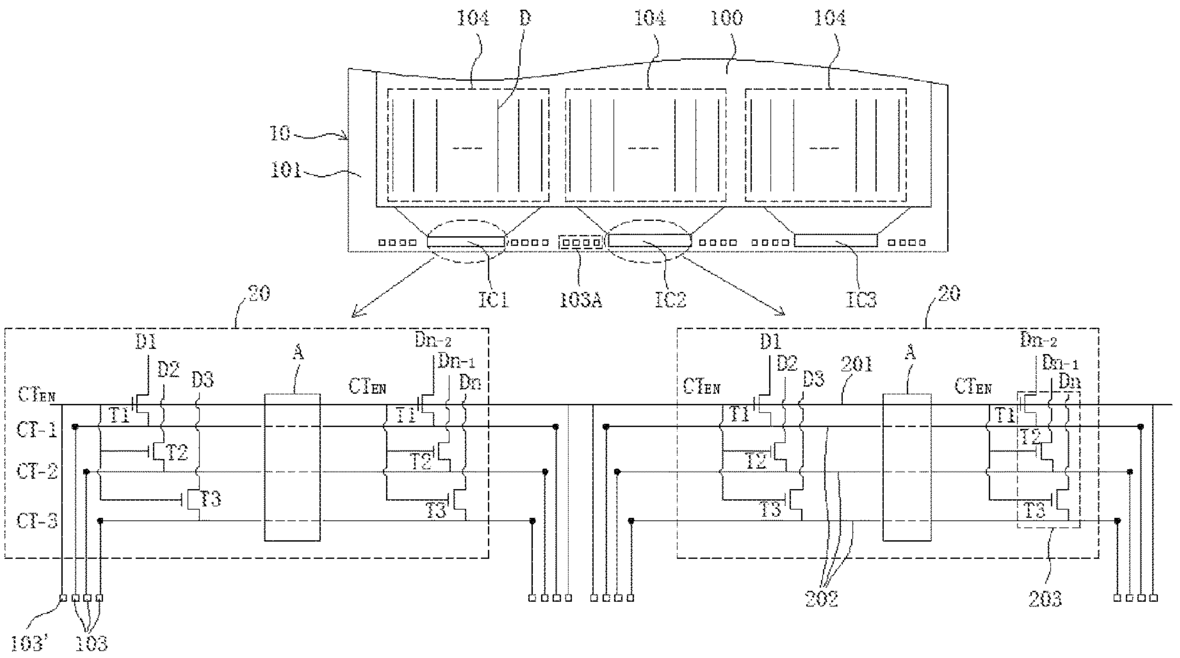
FIG. 3 is a schematic diagram of a structure of a display device provided by a first embodiment of the present disclosure.
Figure 4:
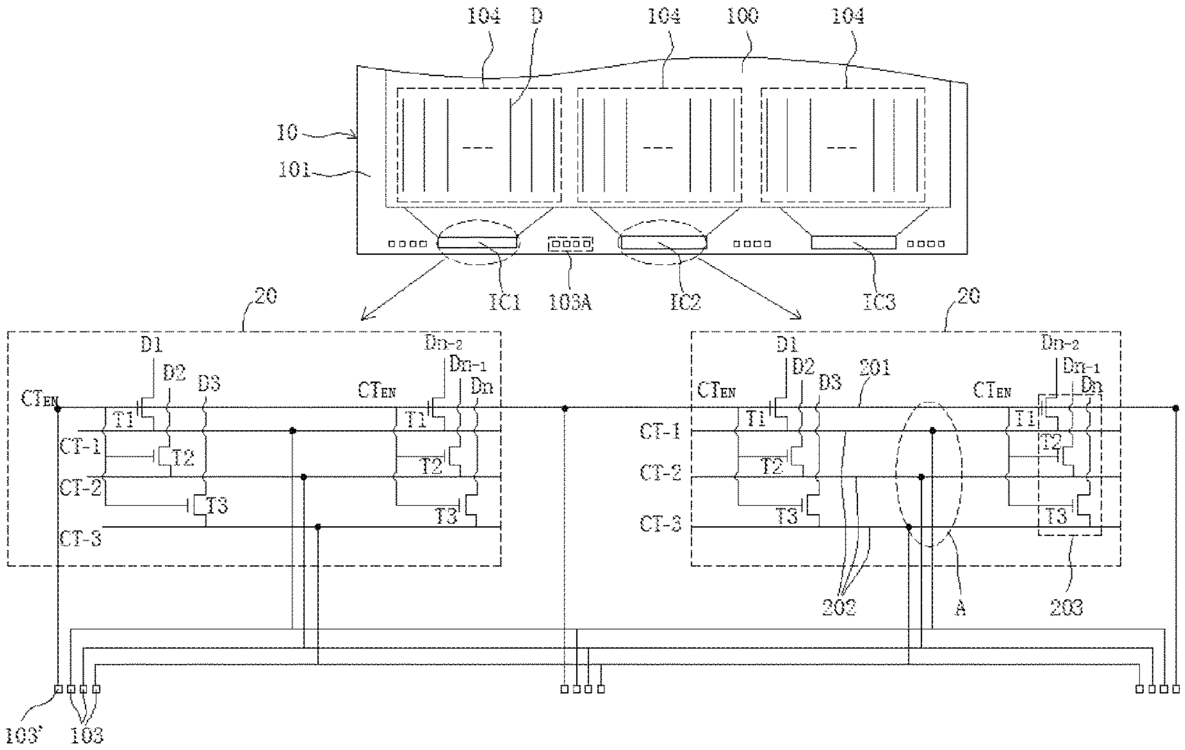
FIG. 4 is a schematic diagram of a structure of a display device provided by a second embodiment of the present disclosure.

Referring to FIGS. 3 to 4, a display device of the present disclosure includes a display panel 10 and at least two driving chips IC located in a bonding area of the display panel 10. A display area 100 of the display panel 10 includes a plurality of data lines. Equally divided portions of the data lines are respectively coupled to the driving chips IC. Each of the driving chips IC has a cell test (CT) detection circuit 20 disposed therein. The detection circuit 20 includes a plurality of sub-detection circuits. Each of the sub-detection circuits is coupled to one data line D in the display area 100 of the display panel 10. Each of the sub-detection circuits includes a control switch T. Each of the sub-detection circuits is correspondingly coupled to the one data line D through the control switch T corresponding to each of the sub-detection circuits.

A plurality of detection pads are disposed in a non-display area 101 on a side of the display panel 10 corresponding to the driving chips IC. The detection pads are electrically coupled to the detection circuits 20. A plurality of detection signals received by the detection pads are transmitted to the data lines through the sub-detection circuits.

The portion of the data lines correspondingly coupled to each of the driving chips IC is grouped into a data line group 104. Resistance of the sub-detection circuits correspondingly coupled to the portion of the data lines in the data line group 104 gradually increases from two sides of the data line group 104 to a middle of the data line group 104; alternatively, resistance of the sub-detection circuits correspondingly coupled to the portion of the data lines in the data line group 104 gradually increases from a middle of the data line group 104 to two sides of the data line group 104.

In the present disclosure, coupling lines between the detection circuits of each adjacent two of the driving chips are disconnected to reduce loads of the detection circuits. A detection signal sending manner is changed to sending to either two sides or a middle of the detection circuit of a single driving chip. The resistance of the sub-detection circuits correspondingly coupled to the portion of the data lines in each of the data line groups is caused to continuously gradually vary. Thus, a problem that a situation in which detection circuits are placed in driving chips IC easily causes pixel charging rate differences, resulting in a split-screen phenomenon of a display panel, is solved.

Hereinafter, the display device of the present disclosure is described in detail in conjunction with the specific embodiments.

FIRST EMBODIMENT

Referring to FIG. 3, FIG. 3 is a schematic diagram of a structure of a display device provided by a first embodiment of the present disclosure. In the present embodiment, N of the driving chips and 2N detection pad groups 103A are disposed in the display device. N is a positive integer greater than or equal to one. In the present embodiment, it is taken as an example that there are three driving chips disposed in the display device. Each of the driving chips IC has the detection circuit 20 disposed therein. The detection circuit 20 includes a detection control line 201, at least two detection signal lines 202, and a plurality of control switch groups 203. A portion of the control switches T in each of the control switch groups 203 is in one-to-one correspondence with the detection signal lines 202. The control switch T has an input terminal coupled to the detection signal line 202 corresponding to the control switch T, a control terminal coupled to the detection control line 201, and an output terminal coupled to the data line D.

In the present embodiment, each of the control switch groups 203 includes:

- a first control switch T1 that has a control terminal coupled to a detection control signal $CT_{EN}$, an input terminal receiving a first detection signal CT-1, and an output terminal coupled to one of a first type of data lines, such as one of data lines coupled to red sub-pixels;
- a second control switch T2 that has a control terminal coupled to the detection control signal $CT_{EN}$, an input terminal receiving a second detection signal CT-2, and an output terminal coupled to one of a second type of data lines, such as one of data lines coupled to green sub-pixels; and
- a third control switch T3 that has a control terminal coupled to the detection control signal $CT_{EN}$, an input terminal receiving a third detection signal CT-3, and an output terminal coupled to one of a third type of data lines, such as one of data lines coupled to blue sub-pixels.

The detection control signal $CT_{EN}$ can control on and off of each of the control switches, thereby controlling whether the CT detection circuit operates. The first control switch T1, the second control switch T2, and the third control switch T3 can be thin film transistors. Adjacent two of the data lines are correspondingly coupled to adjacent two of the portion of the control switches in each of the control switch groups 203. The data lines in the panel are divided into the first type of data lines, the second type of data lines, and the third type of data lines according to an arrangement of the sub-pixels coupled to the data lines.

In the present embodiment, each of the detection pad groups 103A includes at least two first detection pads 103 that are in one-to-one correspondence with the detection signal lines 202 and a second detection pad 103' corresponding to the detection control line 201. Each of the driving chips IC is correspondingly coupled to two of the detection pad groups 103A, and two of the first detection pads 103 in the two of the detection pad groups 103A send one of the detection signals to two ends of each of the detection signal lines 202. That is, two nodes where the one of the detection signals is sent to are located at the two ends of each of the detection signal lines 202. In the present embodiment, two of the detection pad groups 103A that are disposed between each adjacent two of the driving chips are independent. The two independent detection pad groups 103A respectively provide the detection signals to each adjacent two of the driving chips. Thus, there is no need for each adjacent two of the driving chips IC to share one detection pad group 103A. Thus, signal provision ability of the detection circuit 20 is ensured. Also, because the detection circuits 20 of each adjacent two of the driving chips IC are coupled only through the detection control line 201, loads of each of the detection circuits 20 are smaller. Thus, the signal provision ability of the detection circuits 20 of the different driving chips IC is comparable, so between the driving chips IC, signal provision differences that cause a screen to be split into pixels of the display area that correspond to the different driving chips IC are prevented.

The portion of the data lines correspondingly coupled to each of the driving chips IC is grouped into the data line group 104. Because the two of the detection pad groups 103A respectively provide the detection signals to two ends of the detection signal lines 202, the resistance of the sub-detection circuits correspondingly coupled to the portion of the data lines in the data line group 104 gradually increases from the two sides of the data line group 104 to the middle of the data line group 104. If a data line $D_3$ and a data line $D_{n-2}$ are two adjacent data lines, resistance of the sub-detection circuits coupled to a data line $D_1$ to the data line $D_3$ gradually increases, i.e., has smaller differences. Resistance of the sub-detection circuits coupled to a data line $D_n$ to the data line $D_{n-2}$ gradually increases, i.e., has smaller differences. Resistance of the sub-detection circuits coupled to the data line $D_3$ and the data line $D_{n-2}$ is same or comparable (i.e., has a smaller difference). That is, the resistance of the sub-detection circuits correspondingly coupled to the portion of the data lines in the data line group 104 consistently vary from the two sides of the data line group to the middle of the data line group. Thus, a signal provision difference between the adjacent sub-detection circuits is reduced, thereby reducing a pixel charging rate difference between the sub-pixels corresponding to the adjacent data lines. Thus, resistance of sub-detection circuits respectively on two sides of an area A corresponding to dummy pins has a smaller difference or is comparable, so in each of the driving chips IC, signal provision differences that cause a screen to be split at pixels of the display area that correspond to a middle of each of the driving chips IC are prevented.

In addition, this design causes resistance of adjacent sub-detection circuits respectively of each adjacent two of the driving chips IC to have a smaller difference or to be comparable, so signal provision differences that cause a screen to be split into pixels of the display area that correspond to the different driving chips IC are prevented.

SECOND EMBODIMENT

Referring to FIG. 4, FIG. 4 is a schematic diagram of a structure of a display device provided by a second embodiment of the present disclosure. The structure of the display device of the present embodiment is same or similar to the structure of the display device of the first embodiment. Differences are as follows. In the present embodiment, N of the driving chips and N+1 detection pad groups 103A are disposed in the display device. N is a positive integer greater than or equal to one. Each of the detection pad groups 103A includes at least two first detection pads 103 that are in one-to-one correspondence with the detection signal lines 202 and a second detection pad 103' corresponding to the detection control line 201. Two of the first detection pads 103 in two of the detection pad groups 103A send one of the detection signals to a middle of each of the detection signal lines 202 to commonly drive one of the driving chips IC. Thus, the resistance of the sub-detection circuits correspondingly coupled to the portion of the data lines in the data line group 104 gradually increases from the middle of the data line group 104 to the two sides of the data line group 104.

A node where the one of the detection signals of the detection circuit 20 of one of the driving chips IC is sent to is located at the middle of each of the detection signal lines. Further, a number of sub-detection circuits of the sub-detection circuits is same or comparable for each of two sides of the node where the one of the detection signals is sent to.

If a data line $D_3$ and a data line $D_{n-2}$ are two adjacent data lines, resistance of the sub-detection circuits coupled to a data line $D_1$ to the data line $D_3$ gradually decreases, i.e., has smaller differences. Resistance of the sub-detection circuits coupled to a data line $D_n$ and the data line $D_{n-2}$ gradually decreases, i.e., has smaller differences. Resistance of the sub-detection circuits coupled to the data line $D_3$ and the data line $D_{n-2}$ is same or comparable (i.e., has a smaller difference). That is, the resistance of the sub-detection circuits correspondingly coupled to the portion of the data lines in the data line group 104 consistently vary from the middle of the data line group to the two sides of the data line group. Thus, a signal provision difference between the adjacent sub-detection circuits is reduced, thereby reducing a pixel charging rate difference between the sub-pixels corresponding to the adjacent data lines. Thus, resistance of sub-detection circuits respectively on two sides of an area A corresponding to dummy pins has a smaller difference or is comparable, so in each of the driving chips IC, signal provision differences that cause a screen to be split at pixels of the display area that correspond to a middle of each of the driving chips IC are prevented.

In addition, this design causes resistance of adjacent sub-detection circuits respectively of each adjacent two of the driving chips IC to have a smaller difference or to be comparable, so signal provision differences that cause a screen to be split into pixels of the display area that correspond to the different driving chips IC are prevented.

Furthermore, in the present embodiment, each of a second detection pad group 103A of the detection pad groups to an Nth detection pad group 103A of the detection pad groups provide a portion of the detection signals simultaneously to adjacent two of the driving chips corresponding to each of the second detection pad group 103A of the detection pad groups to the Nth detection pad group 103A of the detection pad groups. That is, in the present embodiment, each adjacent two of the driving chips IC can share one of the detection pad groups 103A. In the present embodiment, because of a design of a signal sending manner, sharing one of the detection pad groups 103A between each adjacent two of the driving chips IC does not affect signal provision ability of the detection circuits 20. Thus, compared with the aforementioned first embodiment, the present embodiment does not increase a number of the detection pads, thereby saving space and reducing probe contact difficulty.

For the display device of the present disclosure, coupling lines between the detection circuits of each adjacent two of the driving chips are disconnected. The detection pad groups two of which send a portion of the detection signals to two sides of the detection circuit of each of the driving chips are independent; alternatively, a portion of the detection signal are sent to a middle of the detection circuit of each of the driving chips. The resistance of the sub-detection circuits correspondingly coupled to the portion of the data lines in each of the data line groups is caused to continuously gradually vary. Thus, the problem that the situation in which the detection circuits are placed in the driving IC chips easily causes the pixel charging rate differences, resulting in the split-screen phenomenon of the display panel, is solved.

In summary, although the present disclosure has been described with the preferred embodiments thereof above, it is not intended to be limited by the foregoing preferred embodiments. Persons of ordinary skill in the art can carry out many changes and modifications to the described embodiments without departing from the scope and the spirit of the present disclosure. Thus, the protection scope of the present disclosure is in accordance with the scope defined by the claims.

What is claimed is:

1. A display device, comprising: a display panel and at least two driving chips located in a bonding area of the display panel;

wherein each of the driving chips has a detection circuit disposed therein; wherein the detection circuit comprises a plurality of sub-detection circuits; wherein each of the sub-detection circuits comprises a control switch; and wherein each of the sub-detection circuits is correspondingly coupled to one of data lines in a display area of the display panel through the control switch corresponding to each of the sub-detection circuits;

wherein a plurality of detection pads are disposed in a non-display area on a side of the display panel corresponding to the driving chips; wherein the detection pads are electrically coupled to the detection circuits; and wherein a plurality of detection signals received by the detection pads are transmitted to the data lines through the sub-detection circuits;

wherein a portion of the data lines correspondingly coupled to each of the driving chips is grouped into a data line group; and wherein a resistance of the sub-detection circuits correspondingly coupled to the portion of the data lines in the data line group gradually increases from two sides of the data line group to a middle of the data line group; or wherein the resistance of the sub-detection circuits correspondingly coupled to the portion of the data lines in the data line group gradually increases from the middle of the data line group to the two sides of the data line group;

wherein the detection circuit comprises a detection control line, at least two detection signal lines, and a plurality of control switch groups; and wherein a portion of the control switches in each of the control switch groups is in one-to-one correspondence with the detection signal lines;

wherein the control switch has an input terminal coupled to the detection signal line corresponding to the control switch, a control terminal coupled to the detection control line, and an output terminal coupled to the data line;

wherein the detection control lines of the detection circuits of each adjacent two of the driving chips are electrically coupled to each other;

wherein N of the driving chips are disposed in the bonding area, the detection pads comprise 2N detection pad groups, and N is a positive integer greater than or equal to one;

wherein each of the detection pad groups comprises at least two first detection pads that are in one-to-one correspondence with the detection signal lines and a second detection pad corresponding to the detection control line; and wherein each of the driving chips is correspondingly coupled to two of the detection pad groups, and two of the first detection pads in the two of the detection pad groups send one of the detection signals to two ends of each of the detection signal lines.

2. The display device of claim 1, wherein the resistance of the sub-detection circuits correspondingly coupled to the portion of the data lines in the data line group consistently vary from the two sides of the data line group to the middle of the data line group.

3. The display device of claim 1, wherein adjacent two of the data lines are correspondingly coupled to adjacent two of the portion of the control switches in each of the control switch groups.

4. A display device, comprising: a display panel and at least two driving chips located in a bonding area of the display panel; wherein a display area of the display panel comprises a plurality of data lines; wherein the data lines are equally divided into portions respectively coupled to the driving chips;

wherein each of the driving chips has a detection circuit disposed therein; wherein the detection circuit comprises a plurality of sub-detection circuits; wherein each of the sub-detection circuits comprises a control switch; and wherein each of the sub-detection circuits is correspondingly coupled to one of the data lines through the control switch corresponding to each of the sub-detection circuits;

wherein a plurality of detection pads are disposed in a non-display area on a side of the display panel corresponding to the driving chips; wherein the detection pads are electrically coupled to the detection circuits; and wherein a plurality of detection signals received by the detection pads are transmitted to the data lines through the sub-detection circuits;

wherein each of the portions of the data lines correspondingly coupled to each of the driving chips is grouped into a data line group; and wherein a resistance of the sub-detection circuits correspondingly coupled to the portion of the data lines in the data line group gradually increases from two sides of the data line group to a middle of the data line group; or wherein the resistance of the sub-detection circuits correspondingly coupled to the portion of the data lines in the data line group gradually increases from the middle of the data line group to the two sides of the data line group;

wherein the detection circuit comprises a detection control line, at least two detection signal lines, and a plurality of control switch groups; and wherein a portion of the control switches in each of the control switch groups is in one-to-one correspondence with the detection signal lines;

wherein the control switch has an input terminal coupled to the detection signal line corresponding to the control switch, a control terminal coupled to the detection control line, and an output terminal coupled to the data line;

wherein the detection control lines of the detection circuits of each adjacent two of the driving chips are electrically coupled to each other;

wherein N of the driving chips are disposed in the bonding area, the detection pads comprise 2N detection pad groups, and N is a positive integer greater than or equal to one;

wherein each of the detection pad groups comprises at least two first detection pads that are in one-to-one correspondence with the detection signal lines and a second detection pad corresponding to the detection control line; and wherein each of the driving chips is correspondingly coupled to two of the detection pad groups, and two of the first detection pads in the two of the detection pad groups send one of the detection signals to two ends of each of the detection signal lines.

5. The display device of claim 4, wherein the resistance of the sub-detection circuits correspondingly coupled to the portion of the data lines in the data line group consistently vary from the two sides of the data line group to the middle of the data line group.

6. The display device of claim 4, wherein adjacent two of the data lines are correspondingly coupled to adjacent two of the portion of the control switches in each of the control switch groups.

7. A display device, comprising: a display panel and at least two driving chips located in a bonding area of the display panel;

wherein each of the driving chips has a detection circuit disposed therein; wherein the detection circuit comprises a plurality of sub-detection circuits; wherein each of the sub-detection circuits comprises a control switch; and wherein each of the sub-detection circuits is correspondingly coupled to one of data lines in a display area of the display panel through the control switch corresponding to each of the sub-detection circuits;

wherein a plurality of detection pads are disposed in a non-display area on a side of the display panel corresponding to the driving chips; wherein the detection pads are electrically coupled to the detection circuits; and wherein a plurality of detection signals received by the detection pads are transmitted to the data lines through the sub-detection circuits;

wherein a portion of the data lines correspondingly coupled to each of the driving chips is grouped into a data line group; and wherein a resistance of the sub-detection circuits correspondingly coupled to the portion of the data lines in the data line group gradually increases from two sides of the data line group to a middle of the data line group; or wherein the resistance of the sub-detection circuits correspondingly coupled to the portion of the data lines in the data line group gradually increases from the middle of the data line group to the two sides of the data line group;

wherein the detection circuit comprises a detection control line, at least two detection signal lines, and a plurality of control switch groups; and wherein a portion of the control switches in each of the control switch groups is in one-to-one correspondence with the detection signal lines;

wherein the control switch has an input terminal coupled to the detection signal line corresponding to the control switch, a control terminal coupled to the detection control line, and an output terminal coupled to the data line;

wherein the detection control lines of the detection circuits of each adjacent two of the driving chips are electrically coupled to each other;

wherein N of the driving chips are disposed in the bonding area, the detection pads comprise N+1 detection pad groups, and N is a positive integer greater than or equal to one;

wherein each of the detection pad groups comprises at least two first detection pads that are in one-to-one correspondence with the detection signal lines and a second detection pad corresponding to the detection control line; and wherein two of the first detection pads in two of the detection pad groups send one of the detection signals to a middle of each of the detection signal lines.

8. The display device of claim 7, wherein a number of the sub-detection circuits is same for each of two sides of a node where the one of the detection signals is sent to.

9. The display device of claim 7, wherein each of a second detection pad group of the detection pad groups to an Nth detection pad group of the detection pad groups provides a portion of the detection signals simultaneously to adjacent two of the driving chips corresponding to the each of the second detection pad group of the detection pad groups to the Nth detection pad group of the detection pad groups.

10. The display device of claim 7, wherein the resistance of the sub-detection circuits correspondingly coupled to the portion of the data lines in the data line group consistently vary from the middle of the data line group to the two sides of the data line group.

11. The display device of claim 7, wherein adjacent two of the data lines are correspondingly coupled to adjacent two of the portion of the control switches in each of the control switch groups.

* * * * *